UNITED STATES PATENT OFFICE.

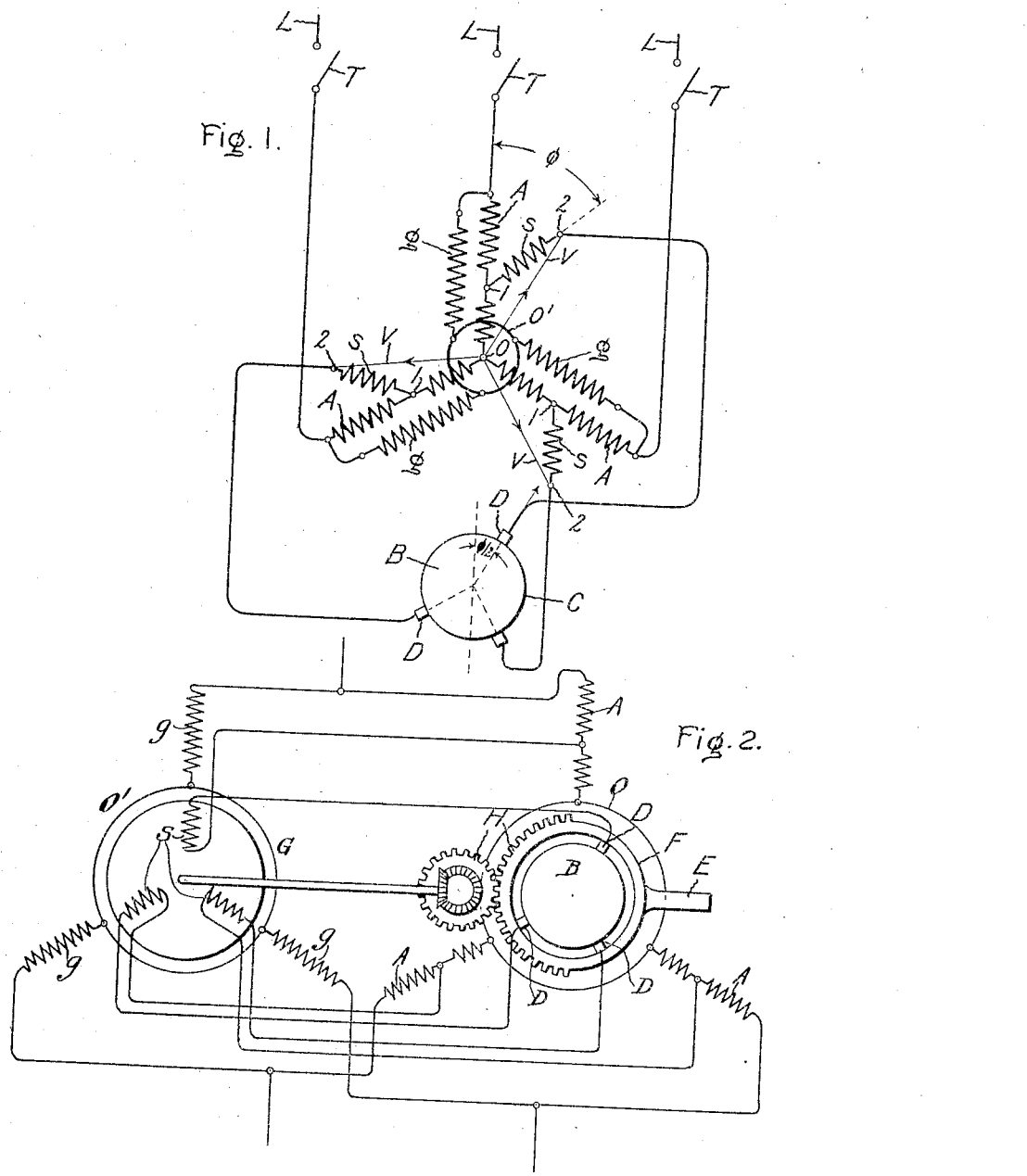

LUDWIG DREYFUS, OF NIEDER-SCHÖNHAUSEN, GERMANY, ASSIGNOR TO GENERAL ELECTRIC COMPANY, A CORPORATION OF NEW YORK.

SYSTEM OF CONTROL.

1,087,355.   Specification of Letters Patent.   Patented Feb. 17, 1914.

Application filed July 18, 1912. Serial No. 710,141.

*To all whom it may concern:*

Be it known that I, LUDWIG DREYFUS, a subject of the King of Great Britain, residing at Nieder-Schönhausen, Germany, have invented certain new and useful Improvements in Systems of Control, of which the following is a specification.

My invention relates to a system of control of alternating current dynamo electric machines and particularly to the control of such machines in which both members are supplied with alternating current. In a shunt dynamo electric machine of this class, when used as a motor, the winding on the stationary or field member is connected to an alternating current source of supply and the rotating member or armature is provided with a commutator and brushes, current being supplied to the latter from the same alternating current source. It is well known that the speed of such a dynamo electric machine, when operating as a motor, or the frequency of the current generated, when operating as a generator, may be varied by varying the voltage impressed on the stationary or rotating members; but with such a variation in voltage, a change occurs in the phase relation of the currents in the two members. For motor operation, the voltage impressed on the rotating member, and for generator operation, the voltage generated in the rotating member, should be substantially in phase with the voltage induced therein by the resultant field.

My invention has for its object a new and improved control system for such dynamo electric machines by which the voltage impressed on the armature winding may be varied but will always remain substantially in phase with the voltage induced in the armature by the resultant field.

To this end my invention consists in certain features of novelty which will be pointed out with particularity in the claims annexed to and forming a part of this specification.

For a better understanding of my invention, reference may be had to the following description taken in connection with the accompanying drawing, in which—

Figure 1 shows diagrammatically a control system for a three phase commutator motor in accordance with my invention; and Fig. 2 is a view of the arrangement of apparatus used in the system of Fig. 1.

Referring to the drawing, A is the stator winding of a three phase commutator motor, and B is the rotary member or armature provided with a commutator C on which brushes D bear. The brushes D may be shifted in any well known manner, as by a handle E on brush yoke F. If the speed of the motor is to be varied, the brushes D are shifted simultaneously with a variation of the value of the armature voltage, the phase of which is shifted relatively to the voltage impressed upon the stator winding so as to be substantially in phase with the armature reaction, or in other words, the voltage induced in the rotating member by the resultant field. Preferably, this is accomplished by means of an induction regulator G, mechanically connected to the brush yoke F.

In the particular arrangement shown in the drawing, the phases of the stator winding A are connected in star at O. $g$, $g$, $g$ are the phases of the primary winding of the induction regulator also connected in star at O', and $s$, $s$, $s$ are the phases of the secondary winding of the induction regulator. The primary phases $g$, $g$, $g$ of the regulator are connected in parallel with the phases of the stator winding, and these two sets of windings are connected to mains L, L, L through switches T, T, T. The secondary winding of the regulator is connected to portions of the stator winding and the free ends thereof are connected to the brushes D of the armature. The voltages impressed on the armature are represented in the drawing by the vectors V and are composed of the partial voltages 0—1 of the stator winding and the secondary voltages 1—2 of the induction regulator. The phase of the secondary voltages is indicated in the drawing by the angle $\varphi$, which is the angle between the voltages of the stator winding and the secondary winding of the induction regulator.

I shall describe my invention in connection with a particular ratio of the partial voltages 0—1 and the secondary voltages 1—2 of the regulator, but it is obvious that other ratios may be chosen. I have selected tap points 1 on the stator winding so that the secondary voltage 1—2 of the regulator equals the partial voltage 0—1 of the stator winding, then the voltage V which is impressed upon the rotor is displaced with relation to the stator voltage by the angle $\varphi/2$. The voltage impressed upon the rotary member will coincide in phase with the voltage induced in it by the resultant rotating field, if the brushes are shifted with relation to the stator axis by the angle $\varphi/2$, and therefore, in this case, proportionality is obtained between the angles of displacement of the potential regulator and the positions given to the brushes D. If the potential regulator and the brush yoke F are mechanically connected together, as by means of gearing H, with a ratio of transmission of 1:2, and the alternating current dynamo electric machine and the induction regulator have the same number of poles, then by displacing the secondary of the induction regulator, the corresponding correct brush position is simultaneously obtained. For convenience, I have shown the brush yoke provided with a handle E for simultaneously shifting both the induction regulator G and the brush yoke F, but the regulator may be provided with a handle if desired.

If the regulator and the dynamo electric machine have unlike numbers of poles, the ratio of transmission of the gearing H is obtained by multiplying the ratio of the pole numbers by 1/2. The ratio of transmission may be somewhat varied if, at every step, it is desired to impress on the rotary member a voltage substantially in phase with the armature reaction with a slight variation caused by phase compensation. By suitably selecting the magnitudes of voltages 0—1 and 1—2, regulation of the phase compensation at all steps may be obtained.

It is not necessary that the voltage 0—1 to which the voltage 1—2 of the secondary of the regulator is added, should be taken from the stator winding, but it may be obtained in any well known manner, and I desire it to be understood that I aim to cover in the appended claims this or any other modification which does not involve a departure from the spirit and scope of my invention.

What I claim as new and desire to secure by Letters Patent of the United States, is,—

1. In combination, an alternating current dynamo electric machine having a stator winding and an armature, said armature being provided with a commutator and brushes, means for varying the value of the armature voltage and shifting its phase relatively to the voltage impressed upon the stator winding, and means for shifting said brushes simultaneously with the variation of the armature voltage.

2. In combination, an alternating current dynamo electric machine having a stator winding and an armature, said armature being provided with a commutator and brushes, means including an induction regulator for varying the value of the armature voltage and shifting its phase relatively to the voltage impressed upon the stator winding, and means for shifting said brushes simultaneously with the variation of the armature voltage.

3. In combination, an alternating current dynamo electric machine having a stator winding and an armature, said armature being provided with a commutator and brushes, a brush yoke for said brushes, and means including an induction regulator mechanically connected to said brush yoke for varying the value of the armature voltage and shifting its phase relatively to the voltage impressed upon the stator winding.

4. In combination, an alternating current dynamo electric machine having a stationary member provided with a polyphase winding, and an armature, said armature being provided with a polyphase winding, a commutator and brushes, means for shifting said brushes, and an induction regulator having a secondary winding, said secondary winding of the regulator being connected to portions of the winding on said stationary member and to said brushes.

5. In combination, an alternating current dynamo electric machine having a stationary member provided with a polyphase winding, and an armature, said armature being provided with a polyphase winding, a commutator and brushes, a brush yoke for said brushes, and an induction regulator mechanically connected to said brush yoke, said induction regulator having a secondary winding connected to portions of the winding on said stationary member and to said brushes.

In witness whereof, I have hereunto set my hand this 27th day of June, 1912.

LUDWIG DREYFUS.

Witnesses:
FRITZ W. BARTSCH,
MAX HELBIG.